United States Patent [19]

Meyer et al.

[11] Patent Number: 5,336,965
[45] Date of Patent: Aug. 9, 1994

[54] SOLAR LOAD REDUCTION GLAZING UNIT WITH ELECTROLUMINESCENT ELEMENT

[75] Inventors: John H. Meyer, Milford; Kenneth J. Gajewski, Woodhaven, both of Mich.

[73] Assignee: Ford Motor Company, Dearborn, Mich.

[21] Appl. No.: 632,212

[22] Filed: Dec. 21, 1990

[51] Int. Cl.$^5$ .................................. H05B 33/22
[52] U.S. Cl. ............................... 313/498; 313/502; 313/506; 313/509; 428/917; 359/359
[58] Field of Search ............. 313/498, 501, 502, 506, 313/508, 509; 428/917, 432, 336; 156/99, 100; 359/357, 359; 219/541, 542, 543; 340/760, 781

[56] References Cited

U.S. PATENT DOCUMENTS

| | | | |
|---|---|---|---|
| Re. 28,199 | 10/1974 | Deb et al. | 350/357 |
| 2,730,644 | 1/1956 | Michlin | 313/498 |
| 3,775,631 | 11/1973 | Morikawa | 313/502 |
| 3,844,637 | 10/1974 | Masi | 350/331 R |
| 3,974,359 | 8/1976 | Orcutt et al. | 219/543 |
| 4,413,885 | 11/1983 | Hareng et al. | 350/342 |
| 4,645,970 | 2/1987 | Murphy | 313/509 |
| 4,671,619 | 6/1987 | Kamimori et al. | 350/357 |
| 4,799,745 | 1/1989 | Meyer et al. | 350/1.7 |
| 4,844,591 | 7/1989 | Arribart et al. | 350/357 |
| 4,844,985 | 7/1989 | Pharms et al. | 428/432 |
| 4,882,517 | 11/1989 | Maruyama et al. | 313/502 |
| 4,904,901 | 2/1990 | Simopoulos et al. | 313/509 |
| 5,073,450 | 12/1991 | Nietering | 359/359 |

Primary Examiner—Michael Horabik
Attorney, Agent, or Firm—Lorraine S. Melotik; Roger L. May

[57] ABSTRACT

A laminated glazing unit incorporates an electroluminescent element laminated to a transparent exterior ply. The electroluminescent element is selectively operable to generate visible light by passing current through electrodes contacting the electroluminescent material. The glazing unit can further have a solar load reduction film. One or more Fabry-Perot interference filters may serve as the electrode(s) of the electroluminescent element to provide the additional function of solar load reduction.

10 Claims, 4 Drawing Sheets

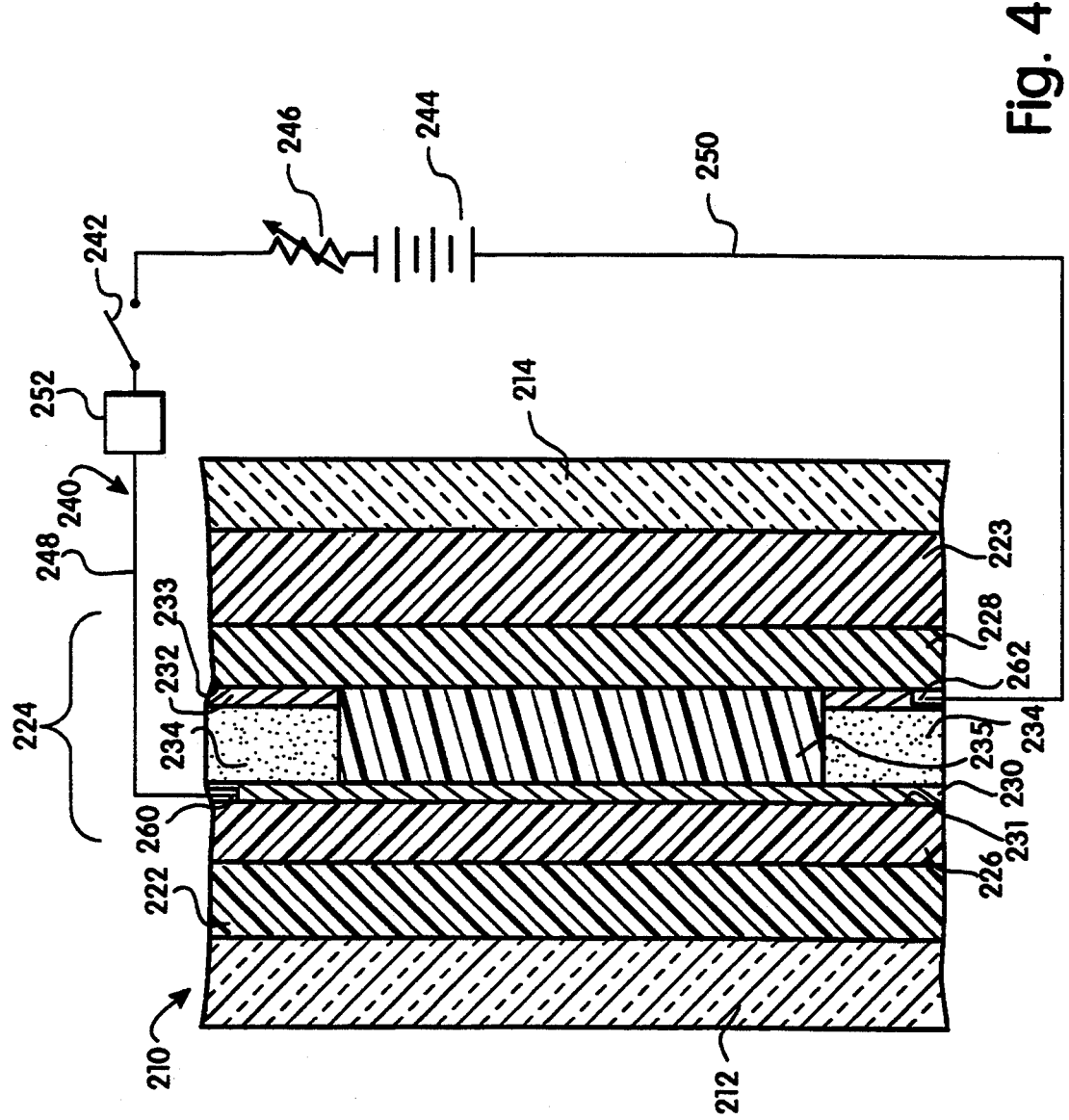

SOLAR LOAD REDUCTION GLAZING UNIT WITH ELECTROLUMINESCENT ELEMENT

FIELD OF THE INVENTION

This invention relates generally to a multi-element, laminated glazing unit and, more particularly, to a glazing unit which provides solar load reduction together with controllable luminescence. The glazing unit of the invention is suitable for use, for example, for architectural and automotive applications, as lenses and for other applications.

BACKGROUND

The incorporation of new features and functionality into glazing units can create new applications for which glazing units were not previously thought suitable. Motor vehicle designs, for example, have tended in recent years to employ ever increasing glazed areas, rather than metal or other opaque body panels, in the window and roof area. Designs calling for entirely glazed window and roof areas have been proposed. Such designs, however, call for various passenger compartment features and devices to be provided in new ways. Thus, for example, protection is needed from sunlight glare, formerly provided by opaque vehicle roofs. For this purpose glazing units are known which provide solar load reduction ("SLR") means for preferentially reflecting infrared and other non-visible radiation (preferentially, that is, relative to light in the visible wavelength range). This is particularly advantageous if the glazing unit is utilized as a motor vehicle window or as an architectural window. Reducing the solar energy passing through a glazing unit is becoming increasingly important in architectural and automotive applications for reasons including improved environmental control and energy conservation. Particularly in the case of automotive applications, increased glazed surface area in the upper part of the vehicle body, that is, in the window and roof area, has resulted in greatly increased solar heating of the passenger compartment of the vehicle. Such heating by solar energy generally is referred to as solar load and there is a growing demand for glazing unit which significantly reduce solar load. It is undesirable to handle increased solar load by increasing the size of the motor vehicle air conditioning unit, in view of the overriding need to reduce the size, weight and power consumption of motor vehicle components for increased fuel efficiency. Accordingly, the need to reduce the solar energy load passing through vehicle glazing has become especially critical.

Additional functionality is desireable in glazing units and certain applications will require certain combinations of features. The present invention provides laminated glazing units advantageously incorporating functionality and combinations of functionality well suited to architectural, automotive and other applications. Particular objects and advantages of the present invention will be understood from the following discussions.

SUMMARY OF THE INVENTION

According to the present invention, a laminated glazing unit is provided which comprises a substantially transparent ply, generally forming an exterior ply of the glazing unit and being referred to as such herein. It may have one or more coatings, films or the like on its exterior and/or interior surface. The interior surface of the exterior ply ("interior" in this usage meaning its laminated surface, that is, the surface which is laminated to, and forms an interface with, another ply or element of the glazing unit) is laminated to an electroluminescent element for generating visible light. The electroluminescent material, preferably electrically excitable chemical compounds known as phosphors, emits a soft, uniform glow of light when electrical current is applied, thereby offering an alternative source of interior lighting. Electroluminescent elements which are not substantially transparent to visible light are incorporated into less than the entire area of the glazing unit. The remaining area remains substantially transparent. Electroluminescent lighting strips can be incorporated, for example, into the structure of a laminated moonroof assembly or all-glass roof for a motor vehicle. In certain preferred embodiments the electroluminescent element is provided in all or a portion of the periphery of the glazing unit, leaving the central area substantially transparent. The luminescent area of the moonroof is preferably around the periphery, leaving the major portion of the glazing unit transparent. Alternately, the luminescent portions can be provided in one or more discrete spots or as a design. The luminescent area preferably has controllable brightness.

The electroluminescent element comprises a layer of electroluminescent material in electrical contact with a pair of electrodes. The electroluminescent material is controllably switchable from a first condition in which it generates visible light to a second condition in which it does not generate visible light, by passing electrical current through the electrodes. Thus, in use the electrodes of the glazing unit will be operatively connected to a source of electrical energy, for example, in an automotive application, to the battery, the generator or the alternator system of the motor vehicle. The electroluminescent element is laminated usually to the inner surface of the exterior ply, typically by means of a layer of flexible polymeric material, for example polyvinylbutyral.

To meet the growing need for glazing units having highly efficient solar load reduction capability, particularly for architectural and automotive glazing applications, the glazing unit of the present invention preferably further includes a SLR element. Such SLR element reduces solar energy passed through the glazing unit regardless whether the electroluminescent element is actuated. The SLR element preferentially excludes non-visible wavelengths (most notably infrared wavelength) radiation while permitting a greater percentage of visible light to pass through the glazing unit. To meet not only the high SLR functionality requirements of certain architectural and automotive applications, but also applicable manufacturing cost and feasibility requirements, the SLR element of the present invention is preferably a Fabry-Perot interference filter, most preferably a sputterred film stack coated onto the interior (i.e., laminated) surface of the exterior ply, typically at the interface between the exterior ply and the aforesaid laminating layer. A typical SLR film stack of the invention comprises, in order, a first continuous zinc oxide film directly on the interior surface of the exterior ply, then a first continuous silver metal film directly over the first zinc oxide film, then a second continuous zinc oxide film, then a second continuous silver metal film and a third continuous dielectric film. The third dielectric film is in interfacial contact with the laminating layer. As discussed further below, the third dielectric film can be a third zinc oxide film, preferably with an ultra-thin chromium oxide, tantalum pentoxide or $SiO_2$ adhesion film between the zinc oxide and the laminating layer to promote more durable adhesion of the film stack to the laminating layer. Alternatively, the third dielectric film can be tantalum pentoxide or other suitable metal oxide or the like. In an alternative embodiment of the invention, an SLR element is incorporated as one or both electrodes of the electroluminescent element, as further discussed below.

The features and functions of the glazing unit of the invention and its various advantages will be better understood from the following detailed description of various preferred embodiments. Certain features or elements which can optionally be included in certain preferred embodiments also are disclosed and discussed below.

BRIEF DESCRIPTION OF THE DRAWINGS

FIG. 4 is a schematic, sectional view, partially broken away, (corresponding to the view of FIG. 2) of a third preferred embodiment of the invention, wherein the SLR element of the invention is incorporated into the electroluminescent element as an electrode.

It should be understood that features and elements of the embodiments of the invention illustrated in FIGS. 1 through 4 are not necessarily precisely to scale. Thickness of electrodes and sputtered SLR coatings are shown larger than true scale, for example, for ease of illustration and better understanding.

DESCRIPTION OF PREFERRED EMBODIMENTS

Glazing units in accordance with the present invention may be adapted for use as architectural windows, including skylights; motor vehicle windows, including sunroofs and all-glass roofs; motor vehicle and building partition panels; and other applications. In all such applications the features and functions of the invention follow the general principles discussed below. Certain preferred embodiments of the invention provide particular advantage and are particularly suitable for use in motor vehicle glazing applications in which the rapidly increasing demand for ever greater glazed area (in lieu of metal or other opaque body panel materials) in the window and roof area has created a sharply felt need for glazing panels having significantly improved SLR functionality. As noted above, increased glazing area also has created a need to incorporate additional functionality into the glazing unit. The electroluminescent element of the invention can serve both aesthetic and functional purposes. The electroluminescent element of a motor vehicle moonroof in accordance with the invention, for example, can provide light for map reading at night and like purposes. So used, the glazing unit may make unnecessary a separate dome light or other lighting unit typically affixed to vehicle roof panels.

The preferred embodiments of the invention now described, beyond merely providing the aforesaid SLR and electroluminescent functionality, have advantageous weight, bulk and cost characteristics. They are relatively thin in cross section and have relatively good manufacturing feasibility coupled with relatively low manufacturing costs. In addition, they are sufficiently durable to withstand prolonged use in an automotive environment. In particular, they can maintain good interfacial adhesion between laminated layers even after prolonged exposure to sunlight or other source of UV radiation.

Figure 1:
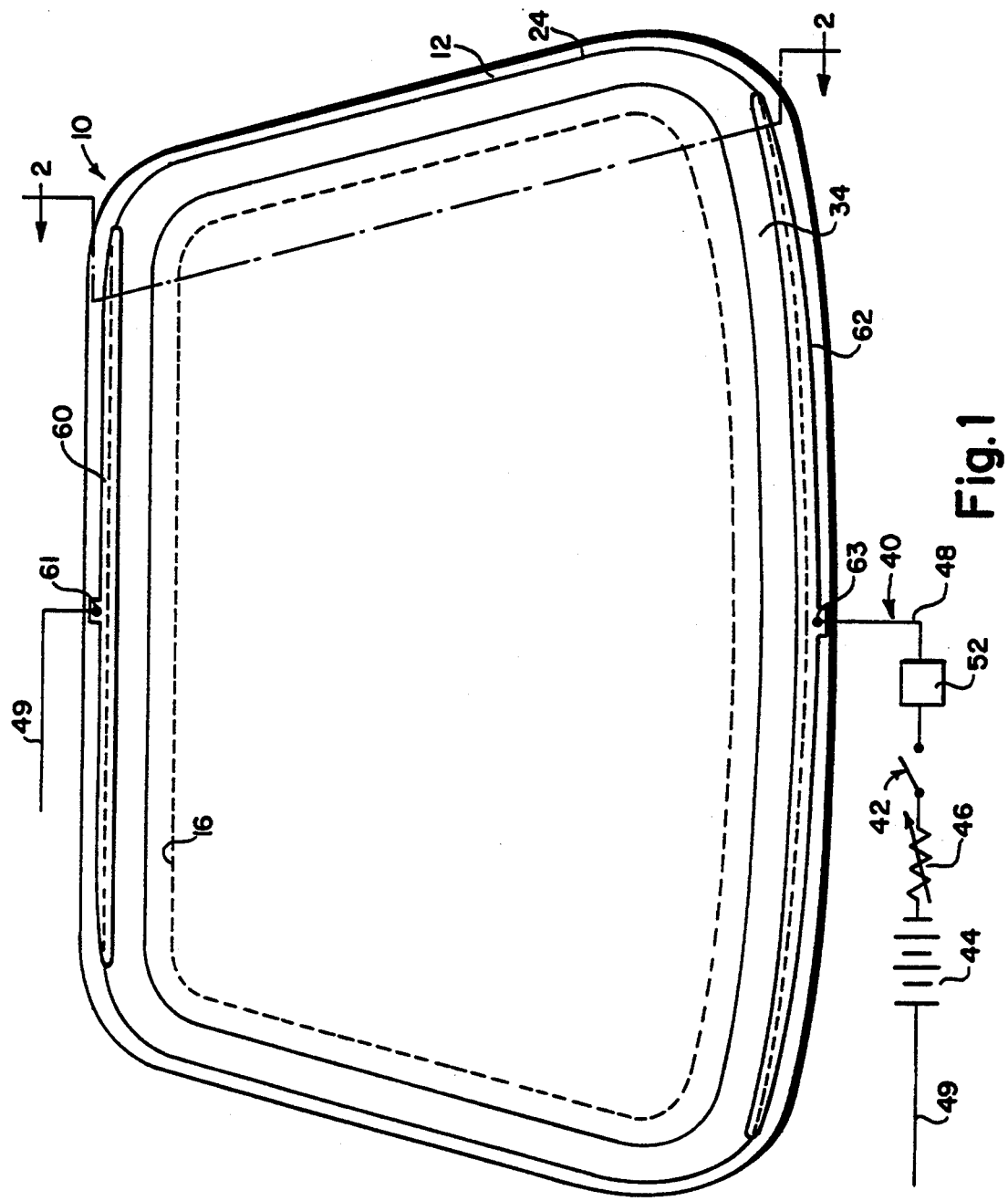
FIG. 1 is a schematic view of a preferred embodiment of the glazing unit of the invention, specifically, a motor vehicle window.
Figure 2:
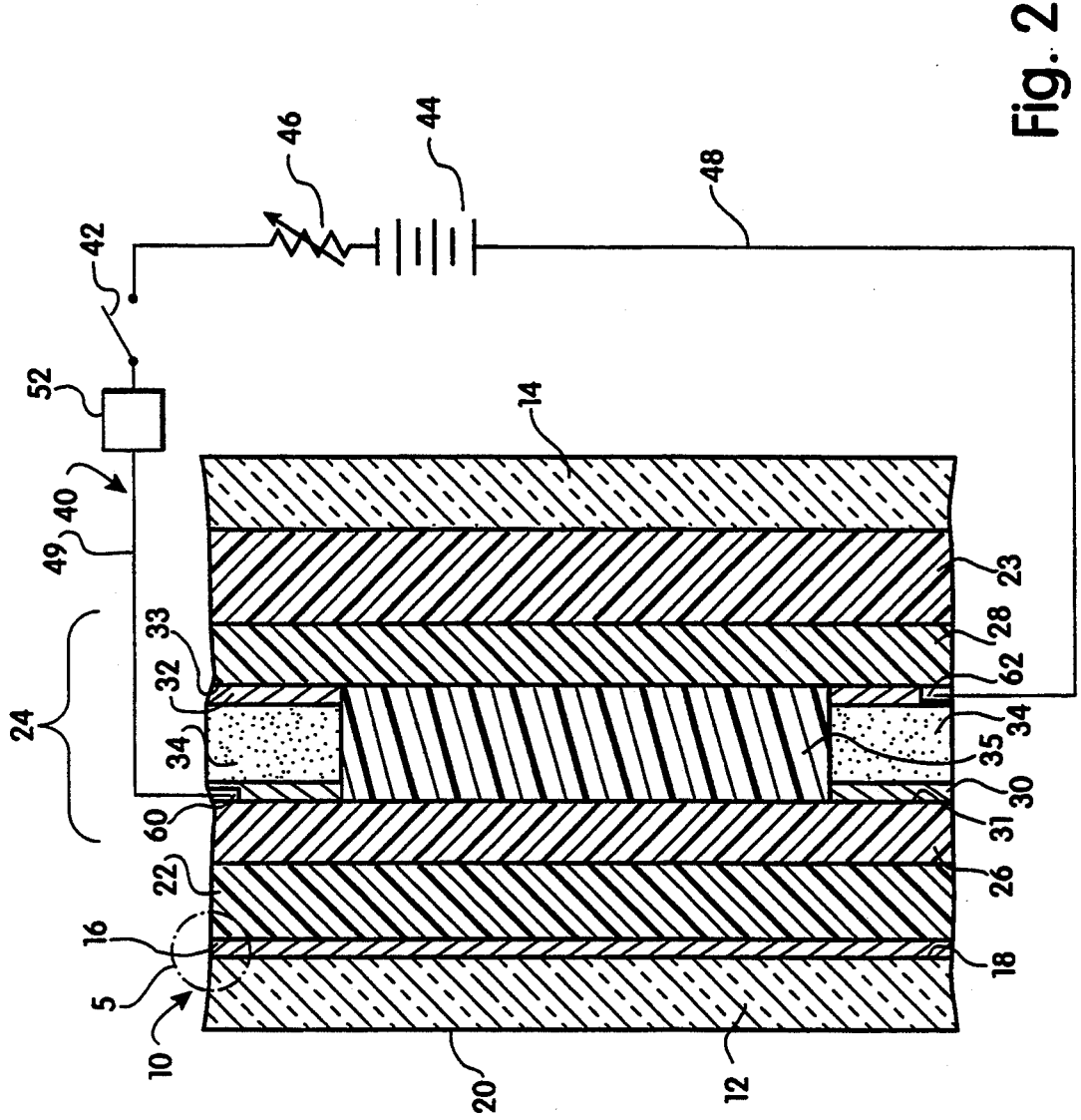
FIG. 2 is a schematic, sectional view, partially broken away, of the motor vehicle window of FIG. 1 taken through line 2—2, wherein an electrical circuit is illustrated diagrammatically, including connection of the electroluminescent means of the window to a source of electrical power.

Referring now specifically to FIGS. 1 and 2, a glazing unit 10, in accordance with a preferred embodiment of the invention, is adapted for use as a motor vehicle window, for example a moonroof. Window 10 comprises a substantially transparent outer glass ply 12 and inner glass ply 14. Suitable transparent substrate materials and constructions alternative to glass plys will be apparent to the skilled of the art in view of the present disclosure. Selection of a particular outer and inner ply material will depend, in part, on the particular application to be made of the glazing unit. Commercially available materials alternative to glass include, for example, plastics such as polyethylene terephthalate ("PET"), polycarbonate, polymethacrylate and the like. Optionally, additional functional or decorative elements may be added, such as an anti-reflective coating or other coating on any appropriate surface of the outer and inner plys.

Glazing unit 10 is seen to further comprise a SLR element 16 on the laminated surface 18 of glass ply 12. As noted above, reference herein to a surface as a "laminate" surface means that it forms a laminated interface with another ply within the laminated structure. The SLR element 16 comprises a Fabry-Perot interference filter which preferentially or selectively excludes infrared and other non-visible raditaion. That is, it excludes a substantial portion of the infrared wavelength radiation while transmitting a substantial portion of the visible light. The Fabry-Perot interference filter of the preferred embodiment of FIGS. 1 and 2 comprises a film stack including, in order: a first continuous zinc oxide dielectric film having a thickness of about 300 to 450 Angstroms directly on surface 18; a first continuous electrically conductive silver metal film covering the dielectric film, having a thickness of about 70 to 120 Angstroms; a second continuous zinc oxide dielectric film over the silver film, having a thickness of about 650 to 1000 Angstroms; a second continuous silver metal film over the second zinc oxide film, having a thickness of about 70 to 120 Angstroms; and a third continuous dielectric film over the second silver film. The third dielectric film is at the interface with laminating layer 22. Suitable laminating materials are commercially available and well known to those skilled in the art. Most preferred is polyvinylbutyral (PVB). Durability of the interfacial adhesion between the SLR element 16 and the PVB or other laminating layer 22 should be excellent for long term use applications such as automotive and architectural glazing applications. To achieve this end, the present invention preferably employs as the third dielectric film of the SLR element 16 a film of zinc oxide having a thickness of about 300 to 450 Angstroms with an ultra-thin film of chromium oxide complex immediately thereover adjacent to the laminating layer 22 in accordance with the teachings of U. S. Pat. No. 4,844,985 to Pharms et al, commonly assigned herewith, which teachings are incorporated herein by reference. The thin chromium oxide film would have a thickness preferably in the range of about 20 to 80 Angstroms.

According to alternative preferred embodiments, excellent durability of adhesion at the interface between the SLR element 16 and the laminating layer 22 is provided by employing as the third dielectric film of the SLR element 16 a film of zinc oxide or other dielectric material having an index of refraction of 1.5 or greater with an ultra-thin adhesion layer of either silicon dioxide or tantalum pentoxide. That is, $SiO_2$ or tantalum pentoxide replaces the aforesaid chromium oxide complex layer. The $SiO_2$ or tantalum pentoxide adhesion film preferably would have a thickness of about 75 to 150 Angstroms. A tantalum pentoxide film of about 250 to 450 Angstroms also can be used as the third dielectric film, replacing both the zinc oxide and the adhesion film. Those skilled in the art will appreciate that additional films, thinner or thicker films, different film materials, etc can be used in applications having different requirements, for example, applications requiring greater or less transmittance of visible light. Likewise, the use of clear glass or tinted glass for one or both of the glass plys will affect the permissible film thickness for a given transmittance requirement. Alternative materials are known for both the metal and the dielectric films of the film stack, the particular materials and thickness specified above, however, are found to provide in preferred embodiments an important coincidence of advantages, for example, up to 65% exclusion of total incident solar energy with at least 70% transmittance of visible light, commercially available and feasible manufacturing techniques, and excellent long term durability in architectural and automotive use environments.

The Fabry-Perot interference filter employed for the SLR element of the present invention can be deposited onto the laminated surface 18 of outer ply 12 by various means, including sputter coating techniques well known to those skilled in the art. It should be noted that the thin films employed in the Fabry-Perot film stack of element 16 have essentially no structural integrity of their own. Thus, it is an important feature of the present invention that the film stack is deposited onto the surface of a substantially inextensible substrate, such as those mentioned above for outer ply 12. Coating such films directly onto the surface of the PVB laminating layer would not be suitable, since the PVB would break down in the vacuum atmosphere used for sputtering and could not withstand the temperature of a chemical vapor deposition ("CVD") process. In addition, adhesion between the laminating layer 22 and the outer ply 12 would be adversely effected if the surface of the laminating layer were coated with the Fabry-Perot film stack before being laminated to a glass ply.

Figure 5:
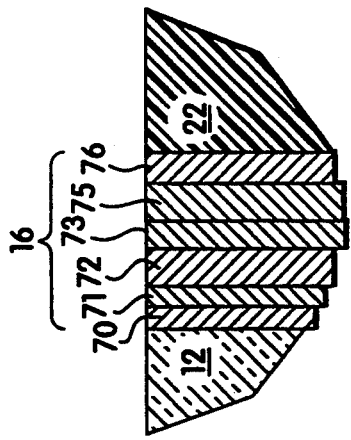
FIG. 5 is a schematic, enlarged sectional view, partially broken away, of the portion within circle 5 in FIG. 2.

In FIG. 5 the Fabry-Perot interference filter which comprises the SLR element 16 is shown in greater detail. Specifically, it is seen to comprise a film stack on the laminated surface of the outer first ply 12, between the first ply and the first laminating layer 22. The film stack includes, in order, a first zinc oxide film 70 adjacent outer ply 12, a first silver metal film 71, a second zinc oxide film 72, a second silver metal film 73 and a third dielectric film consisting of a zinc oxide film 75 with a chromium oxide complex film 76 thereover immediately adjacent to the first laminating layer 22.

Glazing unit 10 further comprises electroluminescent element 24 and a second laminating layer 23 which serves to laminate the electroluminescent element 24 to second ply 14. The same materials discussed above in connection with first laminating layer 22 are suitable for second laminating layer 23. Electroluminescent element 24 can be actuated to generate visible light by selected application of electrical current as further described below. Electroluminescent element 24 comprises first and second flexible, substantially inextensible polymer layers 26 and 28. Suitable materials for inextensible layers 26 and 28 are commercially available and well known to those skilled in the art. Most preferred are PCTFE fluorohalocarbon films, for example ACLAR (trademark) available from Allied Chemical Corporation as an encapsulating envelope, with polyethylene terephthalate (PET) bonded to the inner surface of the PCTFE as a carrier film for the sputtered electrode. Laminating spacer layer 35 can be PVB, for example, and is substantially coextensive with the transparent central area of the glazing unit. In a preferred method for producing superior optically clear laminates having a sheet of semi-rigid material, such as PET, encapsulated in a thermoplastic interlayer, such as PVB, between layers of rigid material, such as glass, pre-cooled laminate elements are assembled at reduced temperature, allowing positioning of the sheet of semi-rigid material in the interlayer of the assembly. Particularly for laminates having relatively extreme bends, this method results in minimal wrinkling, air bubbles and entrapment of moisture. Thereafter, the laminate assembly is maintained under vacuum for an extended period of time, substantially eliminating wrinkling, air bubbles and moisture from between the laminate elements as well as pre-forming the semi-rigid sheet. Bonding heat and pressure is then applied, first heating the assembly to "tack" the laminate elements together, and next applying heat and pressure for bonding the laminate elements. This method is the subject of commonly assigned U.S. Pat. No. 5,147,487 entitled Lamination of Semi-Rigid Material Between Glass, the disclosure of which is hereby incorporated by reference.

First and second electrodes 30 and 32 are provided on the inward facing surfaces 31 and 33, respectively, of layers 26 and 28. At least one of the electrodes must be substantially transparent to visible light. When the light generated by the electroluminescent element is to be viewable from either side of the glazing unit, then both electrodes must be substantially transparent. If the light is to be visible from only one side, which typically would be the case, for example, in a motor vehicle moonroof application, only the electrode on that side would be transparent. Numerous suitable materials for electrodes 30 and 32 are commercially available and are well known to those skilled in the art. Suitable non-transparent electrode materials include, for example, aluminum foil. Suitable materials which are substantially transparent include, for example, a substantially transparent film of indium-tin oxide (ITO) which is preferred, chrome, silver, stainless steel, tin oxide or indium oxide. Fabrication techniques for the electrodes also are well known to those skilled in the art, including chemical vapor deposition and, most preferred, sputter coating techniques discussed above in connection with the fabrication of the SLR element of the invention. Alternative materials and fabrication techniques will be apparent to those skilled in the art in view of the present disclosure.

An electroluminescent material 34 is disposed between the electrodes 30 and 32. As used herein, an electroluminescent material is any suitable material which generates visible light when an electrical current is passed through the electrodes. Preferably, the amount of light generated by the electroluminescent material is continuously variable. Suitable electroluminescent materials are commercially available and are well known to those skilled in the art. Exemplary luminescent materials, sometimes referred to as phosphors, include manganese-doped zinc sulfide, which is preferred in view of its durability and the whiteness and brightness of the light generated. Suitable electroluminescent elements also include vapor deposited film type electroluminescent cells and dispersed type electroluminescent cells in which electroluminescent phosphor or other material is dispersed in a suitable organic or inorganic binder. In certain embodiments, an electrode of indium tin oxide or indium, for example, can be silk screened in a desired pattern onto phosphor material previously applied to aluminum foil or other first electrode. Exemplary suitable electroluminescent elements are disclosed in U.S. Pat. 3,775,631, the disclosure of which is incorporated herein by reference. The inextensible layers 26 and 28 in addition to providing a suitable substrate surface for the electrodes 30, 32 preferably cooperate with each other to form an enclosure to contain the electroluminescent material.

Electroluminescent elements suitable for use in the present invention, having polymer layers carrying electrodes and encapsulating electroluminescent material are commercially available as a pre-manufactured unit, for example, from Loctite Luminescent Systems Inc., Rocky Hill, Conn. and from Rogers Corporation, Farmington, Mich. One preferred pre-manufactured unit from Loctite, Inc. incorporates a dispersion type electroluminescent material comprising manganese-doped zinc sulfide in a matrix sandwiched (along with a dessicant layer) between a non-transparent aluminum foil electrode and a transparent sputtered film of indium-tin-oxide. The electroluminescent material and electrodes are encapsulated in a film of Aclar (trademark) PCTFE material from Allied Chemical Company. The indium-tin-oxide electrode is sputtered onto a PET film bonded to the PCTFE film. Alternative pre-manufactured units are commercially available and their use in the present invention will be apparent to those skilled in the art in view of the present disclosure.

In the preferred embodiment illustrated, electrodes 30 and 32 are in electrical connection with a source of electrical power by means of circuit 40 illustrated diagrammatically in FIG. 2. Circuit 40 is seen to comprise on/off switch 42, electrical power source 44, variable resistor 46 and electrical leads 48 and 49. Circuit 40 allows an operator to selectively apply an electrical potential to the electroluminescent material 34 from electric power supply 44. In the case of an automotive application, such power supply typically would be the vehicle battery, generator or alternator. The pre-manufactured electroluminescent element available from Loctite Luminescent Systems Inc., mentioned above, can be employed in an automobile application, using an inverter to change the vehicle's 12 to 13 volt DC current to 130 to 150 volt, 400 to 600 Hertz AC current. The current draw of that element is about 4 to 6 milliamps per square inch. A typical automobile roof application might employ, for example, about 200 square inches of electroluminescent material, drawing about one amp.

Referring again to FIG. 1, circuit 40 preferably further comprises circuitry means 52 for interrupting power supply to circuit 40 in the event of a discontinuity or other fault in the electroluminescent element. Electrode 32 is substantially coextensive with electrode 30, both being coextensive with the electroluminescent material. Horizontally extending upper bus bar 60 is in substantially continuous line contact with an edge or perimeter of electrode 30. Similarly, lower bus bar 62 is in substantially continuous line contact with an edge or perimeter of the second electrode 32. Thus, application of electrical power to circuit 40 sends electrical current through the electrodes, causing the electroluminescent material to generate visible light. Methods of forming bus bars 60 and 62 are well known to those skilled in the art and will be apparent in view of the present disclosure. The bus bars may be incorporated into pre-manufactured electroluminescent elements. In certain embodiments, bus bars are unnecessary, depending upon the material and configuration of the electrode, anticipated current density, etc.

Lead 48 connects to lower bus bar 62 at terminus 63. Similarly, lead 49 is connected to upper bus bar 60 at terminus 61. Termini 61 and 63 may comprise a solder pad. The use of pre-soldered pads is preferred since they facilitate making the electrical connections, particularly, for example, in the context of assembling a motor vehicle, and are found to provide a secure and sturdy electrical connection. The switch 42 may be a manually operated switch, although circuit 40 may include components automatically responsive to ambient light conditions. Circuit 40 may further include a variable resistance element, such as a variable resistor or potentiometer, or other circuitry for controlling the electrical current applied to electrodes 30, 32. Such variable element could be manually or automatically adjustable, preferably to render the amount of light generated continuously variable.

It is a significant advantage of the present invention that sputter coating processes and equipment for forming the SLR element and the transparent electrode(s) are readily commercially available and well known to those skilled in the art. Sputter coating technology is presently commercially employed, for example, to deposit electrically conductive films and film stacks onto glass plys of a laminated automotive windshield for the purpose of electrically heating the windshield. In fact, in certain preferred embodiments of the invention, the SLR element is connected to an electrical power source for purposes of electrically heating the glazing unit. That is, the SLR element can provide solar load reduction and electrical heating. In the case of a motor vehicle window, for example, the SLR element 16 could be connected to the electrical system of the vehicle in accordance with techniques presently commercially employed.

Figure 3:
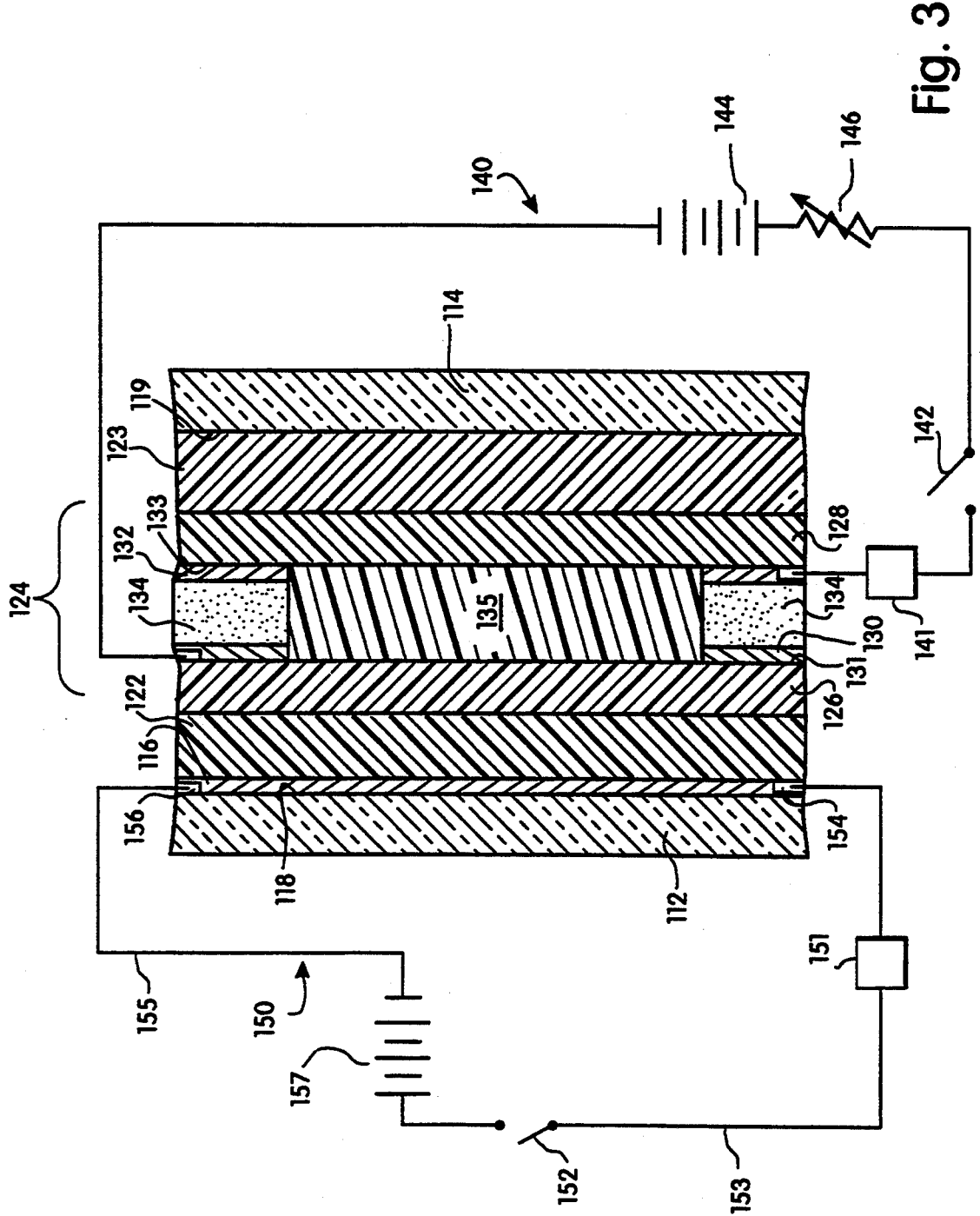
FIG. 3 is a schematic, sectional view, partially broken away, (corresponding to the view of FIG. 2) of a second preferred embodiment of the invention, wherein two electrical circuits of the glazing unit are illustrated diagrammatically, the second circuit providing electrical power to the SLR element for heating the glazing unit.

Suitable circuitry is required to provide electrical power to the SLR element if it is to be used for the additional purpose of electrically heating the glazing unit. A cross-sectional view of a preferred embodiment of the invention incorporating this feature is seen in FIG. 3. Glass plys 112 and 114 are laminated to polyvinylbutyral layers 122 and 123. The laminated surface 118 of outer glass ply 112 is sputter coated with a SLR element 116 which is substantially the same as SLR element 16 of the embodiment of FIGS. 1 and 2. An electroluminescent element 124 is incorporated in accordance with the fabrication techniques and materials described above for electroluminescent element 24 of the embodiment of FIGS. 1 and 2. In the preferred embodiment of FIG. 3 the electroluminescent element 124 comprises first polyethylene terephthalate layer 126 and second polyethylene terephthalate layer 128. Electrode 132 is sputter coated onto inner surface 133 of layer 128. Electrode 130 is aluminum film or foil carried on inner surface 131 of layer 126. Electroluminescent material 134 is sandwiched between electrodes 130 and 132. PVB spacer layer 135 is coextensive with a transparent central area of the glazing unit. Electrical circuit 140 comprises suitable fault detection circuitry 141 similar to circuitry 52 discussed above for the embodiment of FIGS. 1 and 2, on/off switch 142 and variable resistor means 146. It connects electrodes 130 and 132 to electrical power source 144, such that electrical current can be passed through the electroluminescent material.

A second circuit 150 provided with electrical circuitry means 151 for fault detection provides electrical power to the SLR film stack 116 to generate heat for deicing and defogging the glazing unit. Circuit 150 is seen to comprise, in addition to the electrically conductive SLR film stack 116, an on/off switch 152 interrupting electrical lead 153 which extends to a bus bar 154 via suitable connection means, such as the solder pad connections discussed above in connection with the embodiment of FIGS. 1 and 2. Similarly, electrical lead 155 extends to bus bar 156 at the other end of the SLR film stack. The electrical power source 157 may be the same as, or different from, electrical power source 144. The various bus bars and electrical leads can be formed by silk screening electrically conductive ceramic paint onto the surface of the glass ply 112, or formed by other methods known to the skilled of the art.

In all other respects the glazing unit of FIG. 3 can be constructed using materials and processes substantially the same as that described above in connection with the embodiment of FIGS. 1 and 2. Thus, the glazing unit of FIG. 3 provides operator-controlled lighting together with highly effective SLR functionality and operator-controlled electrical heating. All these functionalities and features are provided in a glazing unit which can be constructed using presently available methods and materials. Thus, a completed glazing unit can be produced which is highly cost effective, narrow in cross section and relatively low weight, making it highly advantageous for use in architectural and especially automotive applications.

A particularly advantageous embodiment of the invention is illustrated in FIG. 4. In the glazing unit 210 of FIG. 4 SLR element 230 on surface 231 of film 226 is substantially coextensive with the vision area of the glazing unit. SLR element 230 is also a substantially transparent electrode for electroluminescent element 224. Specifically, SLR element 230 is a Fabry-Perot interference filter comprising a sputtered film stack on surface 231 of film 226. In all other respects the glazing unit of FIG. 4 is the same as that of FIGS. 1 and 2. Thus, electroluminescent material 234 is sandwiched between electrode 232 on surface 233 of film 228 and SLR electrode 230. PET or PCTFE films 226 and 228 encapsulate the electroluminescent material and electrodes, with spacer layer 235, preferably PVB, in the transparent central area. Circuitry 240 comprises leads 248 and 250 to bus bars 260 and 262, respectively, to provide electrical power to the electroluminescent element from power source 244. On/off switch 242 and variable, operator-controlled resistor 246 allows adjustment of the lighting level. Fault detection circuitry 252 is similar to that discussed above in connection with the embodiment of FIGS. 1 through 3. Outer glass plys 212 and 214 are laminated to opposite sides of the electroluminescent element by PVB layers 222 and 223, respectively. As in the embodiments discussed above, additional circuitry can be provided to provide electrical heating by either or both electrodes 230 and 232.

It will be appreciated from the foregoing that the present invention provides high SLR functionality together with light generating functionality. The glazing unit can be produced using currently available fabrication equipment and techniques. In addition, the particular materials and configuration of the glazing unit provide good long term durability and functionality, particularly with respect to interfacial adhesion of the laminated surfaces.

While particular embodiments of the invention have been illustrated and described, it will be apparent to those skilled in the art in view of the above disclosure that various modifications can be made without departing from the true spirit and scope of the invention. The appended claims are intended to cover all such modifications.

We claim:

1. A laminated glazing unit having an area substantially transparent to visible light, comprising:
   a first ply which is substantially transparent; and
   electroluminescent means coupled to the first ply comprising first and second flexible, substantially inextensible polymer layers, each having an inward surface facing the other, first and second electrodes and a layer of electroluminescent material between the electrodes, the electroluminescent material being controllably switchable to a condition in which it generates visible light by selectively passing electrical current through the electrodes, the first and second electrodes, at least one of which is substantially transparent to visible light, being on the inward surface of the first and second polymer layers, respectively, and substantially coextensive with the layer of electroluminescent material, the layer of electroluminescent material being sandwiched between the electrodes.

2. The laminated glazing unit of claim 1 wherein each electrode is a substantially transparent indium-tin oxide film sputter coated onto the inward surface of a corresponding one of the inextensible polymer layers.

3. The laminated glazing unit of claim 1 further comprising a first laminating layer of flexible polymeric material laminating a surface of the first ply to an outward surface of the first polymer layer of the electroluminescent means.

4. The laminated glazing unit of claim 1 further comprising solar load reduction means comprising a Fabry-Perot interference filter on a surface of the glazing unit and coextensive with at least a portion of the substantially transparent area of the glazing unit for preferentially reducing transmission of non-visible radiation through the glazing unit.

5. A laminated glazing unit having an area substantially transparent to visible light, comprising:
a first ply which is substantially transparent;
electroluminescent means for controllably generating visible light, the electroluminescent means comprising first and second electrodes and a layer of electroluminescent material between the electrodes, the electroluminescent material being controllably switchable to a condition in which it generates visible light by selectively passing electrical current through the electrodes;
solar load reduction means comprising a Fabry-Perot interference filter on a surface of the glazing unit and coextensive with at least a portion of the substantially transparent area of the glazing unit for preferentially reducing transmission of non-visible radiation through the glazing unit;
first and second flexible, substantially inextensible polymer layers, each having an inward surface facing the other, the first and second electrodes, at least one of which is substantially transparent to visible light, being on the inward surface of the first and second polymer layers, respectively, and being substantially coextensive with the layer of electroluminescent material, the layer of electroluminescent material being sandwiched between the electrodes; and
a first laminating layer of flexible polymeric material laminating a surface of the first ply to an outward surface of the first polymer layer of the electroluminescent means, wherein the Fabry-Perot interference filter is a film stack sputter coated onto said surface of the first ply mediate the first ply and the first laminating layer, the film stack including, in order, at least a first zinc oxide film directly on the first ply, a first silver metal film, a second zinc oxide film, a second silver metal film and a dielectric film adjacent the first laminating layer.

6. The laminated glazing unit of claim 5 wherein the dielectric film is selected from the group consisting of (i) a zinc oxide film with a chromium oxide or silicon dioxide or tantalum pentoxide film immediately adjacent to the first laminating layer, and (ii) a tantalum pentoxide film.

7. The laminated glazing unit of claim 6 further comprising a second ply which is substantially transparent and substantially inextensible, and a second laminating layer of flexible polymeric material laminating the second ply to an outward surface of the second polymeric layer of the electroluminescent means, the electroluminescent means being sandwiched between the first laminating layer and the second laminating layer.

8. The laminated glazing unit of claim 7 wherein the inextensible polymer layers consist of fluorohalocarbon film.

9. A laminated glazing unit having an area which is substantially transparent to visible light, comprising:
electroluminescent means for controllably generating visible light comprising (i) first and second electrodes, at least one of which is substantially transparent to visible light, sandwiching between them (ii) a layer of electroluminescent material, and (iii) first and second flexible, substantially inextensible polymeric layers sandwiching the electrodes and electroluminescent material between them, wherein the electrodes are sputter coated, one each, onto an inward surface of a corresponding one of the inextensible polymeric layers;
first and second substantially transparent, substantially self-supporting plys sandwiching between them said electroluminescent means;
a first laminating layer of flexible polymeric material laminating the electroluminescent means to the first substantially self-supporting ply, and a second laminating layer of flexible polymeric material laminating the electroluminescent means to the second substantially self-supporting ply; and
a Fabry-Perot interference filter for reducing infrared light energy transmitted through the glazing unit, the interference filter comprising a film stack sputter coated onto the laminated surface of the first ply mediate the first ply and the first laminating layer, the film stack including, in order, at least a first zinc oxide film adjacent the first ply, a first silver metal film, a second zinc oxide film, a second silver metal film and a dielectric film consisting of zinc-oxide with a film of chromium oxide complex thereover immediately adjacent the first laminating layer.

10. The laminated glazing unit of claim 9 wherein the first and second self-supporting plys are glass.

* * * * *